Patented Aug. 4, 1942

2,291,642

UNITED STATES PATENT OFFICE 2,291,642

METHOD OF PREPARING ARSENATE OF LEAD

John F. Les Veaux, Middleport, N. Y., assignor to Niagara Sprayer and Chemical Co., Inc., Middleport, N. Y., a corporation No Drawing. Application November 4, 1938, Serial No. 238,887

18 Claims. (Cl. 23—54)

This invention relates to an improved water-insoluble arsenate of lead and more particularly to an improved basic arsenate of lead adapted for use for controlling certain insect pests on growing plants by the dusting method and to a method of making same.

The basic arsenate of lead hitherto available as prepared by the methods known prior hereto while quite effective for the particular purpose indicated above has been found to be subjected to certain disadvantages in actual use, more particularly with respect to the difficulty of obtaining a uniform distribution of the material over the surfaces of the plant by the usual dusting methods without using excessive or objectionable quantities of the material, which disadvantages I have found to be due largely to its relatively high apparent density or weight per cubic foot. One of the objects of the present invention, therefore, is to provide an improved basic arsenate of lead having a much greater bulk per unit weight or a much smaller apparent density than any previously known basic arsenate of lead when prepared in a form suitable for use by the dusting method.

Another object of the present invention is to provide a more convenient and economical method for manufacturing a basic arsenate of lead, which method is adapted for use in making this material for general use but more particularly for the special uses just mentioned in connection with the dusting of plants for the control of insect pests.

Another object of the present invention is to provide an improved method of making basic arsenate of lead which requires less time for separating it from the aqueous suspension in which it is first formed by the usual methods of preparation and which also requires less time and less heat for drying the material after it has thus been separated from the aqueous medium.

Prior hereto the usual method employed commercially for the manufacture of basic arsenate of lead has consisted essentially in chemically reacting a water-solution of arsenic acid with a water-suspension of litharge in the presence of a relatively small proportion of a water-soluble activator or so-called soluble catalyst such as acetic acid or nitric acid or the basic lead salts corresponding to these acids. Such a method is described in very general terms in the Luther and Volck U. S. Patent 892,603, patented July 7, 1908. So far as applicant is aware this chemical reaction has hitherto been carried out in a single step by employing a so-called combining weight of lead oxide or litharge and a combining weight of arsenic acid, corresponding to the proportion of one mole of the anhydride of arsenic acid ($As_2O_5$) or two moles arsenic acid ($H_3AsO_4$) to about 2.9 moles of the lead oxide. As indicated above I have found that when the process is carried out in this manner, the basic arsenate of lead thus produced settles out very slowly from the aqueous medium and is difficult to dry, and I believe that both of these difficulties are due to the somewhat gelatinous or hydrophillic colloidal nature of the basic lead arsenate precipitate, and I have discovered that both of these difficulties may be largely or completely overcome and at the same time a new type of basic lead arsenate product may be produced, by carrying out the chemical reaction of the process in a plurality of steps, which comprises first chemically reacting the arsenic acid with a first portion of the litharge which is substantially less than that required to convert the whole of the arsenic acid into insoluble acid lead arsenate, to convert the said first portion of the litharge into acid lead arsenate ($PbHAsO_4$) in suspension in the water leaving a substantial portion of the arsenic acid unreacted upon and then chemically reacting the acid lead arsenate thus formed and the unreacted portion of the arsenic acid which is left over, with the remaining portion of the litharge necessary, at complete equilibrium, to convert substantially all of the acid lead arsenate and substantially all of the unreacted or remaining arsenic acid into a basic arsenate of lead.

In carrying out my invention I prefer to proceed in accordance with the following example.

Example 1.56 moles of finely divided lead oxide is suspended in 191 moles of water heated to about 82° C. and maintained in suspension by stirring and to this suspension is slowly added 0.0903 mole of acetic acid in the form of an 80% solution in water. While maintaining the suspension thus obtained at a temperature of about 82° C. there is now added two moles of arsenic acid or one mole of $As_2O_5$ in solution in water containing about 60% by weight of $As_2O_5$. After the reaction has reached substantial equilibrium (or substantially all of the lead oxide is converted to acid lead arsenate leaving an excess of uncombined arsenic acid) and while maintaining the insoluble material in suspension by stirring and while also maintaining the temperature at about 82° C., there is next added, preferably by sifting, about 1.81 moles of finely divided lead oxide and the suspended mixture maintained at about this same temperature of about 82° C. for about 30 minutes or until the speed of the reaction falls off very abruptly. At this point substantially all of the lead oxide and the arsenic acid which has been employed is converted into a highly granular nongelatinous or hydrophobic finely divided insoluble arsenate of lead containing, when dried about 3.37 moles of litharge to one mole of the anhydride of the arsenic acid ($As_2O_5$) corresponding to two moles of arsenic acid ($H_3AsO_4$). The stirring is then discontinued and the granular quick settling non-gelatinous or hydrophobic lead arsenate permitted to settle to a thick sludge which is then separated from the remainder of the batch and dried in any convenient manner, preferably on an atmospheric drum dryer. If the dried product is to be used for dusting plants, it is suitably ground and sieved in which state it has an apparent density of about $\frac{1}{74}$ of a pound per cubic inch, corresponding to about 74 cubic inches per pound, as determined by the well known "bouncing" test.

It is to be understood, however, that my invention is not limited to the specific details set forth in the preceding example but that various changes may be made therein as hereinafter explained without departing from the true scope of my invention as set forth in the appended claims. Thus, I have found that instead of employing 1.56 moles of finely divided lead oxide to 2 moles of arsenic acid (or 1 mole of $As_2O_5$) in the first step of the process described in the said example, I may employ not less than about 1 mole of finely divided lead oxide or litharge and not substantially more than about 2 moles of the finely divided lead oxide in this first step. I have found also that when substantially more than 2 moles of finely divided lead oxide is employed in this first step of the process, the resulting sludge becomes objectionably thick and that when substantially less than about 1 mole of litharge is used at this stage an excessive amount of the arsenic acid remains unreacted upon which, it is believed, tends to dissolve the insoluble acid arsenate of lead which is formed at this stage of the process so that the proper formation of nuclei or small particles of insoluble acid arsenate of lead is seriously inhibited or entirely prevented. It is believed that these starting nuclei or small particles of insoluble acid arsenate of lead should be present in sufficient number and should be of sufficient size to promote the building up on them of an outer shell or covering of the basic arsenate of lead formed in the second step of the method described in the above example. It should also be understood that a basic arsenate of lead is one which may contain from about 2.9 moles of lead oxide combined with one mole of arsenic pentoxide ($As_2O_5$) up to 3.37 moles or more of lead oxide in combination with each mole of arsenic pentoxide ($As_2O_5$).

While it is believed that the particles of the arsenate of lead as finally formed, after the completion of the second step mentioned above, have a nuclear structure when first formed as indicated above, it is to be clearly understood that I am not bound by this theory or explanation of the results obtained or of the limits of the proportions of the reactants employed in each of the two steps of the process as outlined above although I believe that this is the best explanation of the results obtained and of these limiting proportions of the reactants found necessary to give best results.

Also it will be understood that the proportion of 191 moles of water employed in the above example may be varied over rather wide limits although I have found that when less than about 90% of this proportion of water is employed the reaction mixture becomes too thick to stir or handle conveniently.

Also it will be understood that the temperature of 82° C. employed in the above example may be varied considerably but I have found that when temperatures substantially below about 70° C. are employed, the speed of reaction is slowed up to an inconvenient degree. At higher temperatures the speed of reaction is considerably increased but at temperatures substantially above about 100° C. it is necessary to employ pressures above atmospheric pressure which involves the use of an inconvenient and expensive autoclave type of apparatus. I, therefore, prefer to operate my process between about 70° C. and about 100° C.

As will be well understood by those skilled in the art, in place of the acetic acid specified in the above example, other so-called catalysts or activators such as nitric acid or basic acetate of lead or basic nitrate of lead may be employed and also the proportions of such catalysts or activators may be varied over rather wide limits. Also the concentration of the arsenic acid employed in the first step of the process may be varied considerably as will be well understood by those skilled in this art.

Also the final arsenate of lead formed by the method of the present invention may be separated from the water, any soluble reaction products or impurities and from the activator by filtration but this requires additional and expensive apparatus and I, therefore, prefer to separate the product by settling to the form of a thick sludge as specified in the above example since the peculiar granular non-gelatinous or hydrophobic character of the product of my invention particularly adapts it to this method of separation. Because of these same properties of the final product, however, it is more easily separated by filtration and the resulting filter cake more easily washed and dried.

When the process of the present invention is conducted within the limits specified above (representing variations of the conditions set forth in the specific example), the final dried product has an apparent density not greater than about $\frac{1}{60}$ of a pound per cubic inch and I have found that this limit of apparent density corresponds to that apparent density above which the product tends to become inconvenient for handling in the dusting machines commonly employed for applying the material to the plants and also fails to carry to, and spread over the surfaces of the plants in a satisfactory manner.

Having thus described my invention, what I claim is:

1. In the method of making an arsenate of lead, the particles of which have an average composition corresponding to a basic arsenate of lead, by the chemical interaction of arsenic acid, a water-suspension of litharge and a relatively small proportion of a water-soluble activator, the steps which comprise first chemically reacting the arsenic acid with a first portion of the litharge in suspension in water containing the activator, the said first portion of the litharge being substantially less than that required to convert the arsenic acid into insoluble acid lead arsenate at equilibrium, maintaining intimate contact between the said first portion of the litharge, the arsenic acid and the activator until substantially all of the said first portion of litharge is converted into insoluble acid lead arsenate in suspension in the water leaving a substantial portion of the arsenic acid unreacted upon, then chemically reacting the mixture of the insoluble acid lead arsenate thus formed and the unreacted portion of the arsenic acid with the remaining portion of the litharge necessary to convert, at equilibrium substantially all of the said acid lead arsenate and the said remaining portion of the unreacted arsenic acid into a basic arsenate of lead but not substantially more than a total of about 3.37 moles to each mole of arsenic pentoxide as originally employed in the first step.

2. In the method of making an arsenate of lead, the particles of which have an average composition corresponding to a basic arsenate of lead, by the chemical interaction of arsenic acid, a water-suspension of litharge and a relatively small proportion of a water-soluble activator, the steps which comprise first chemically reacting the arsenic acid with a first portion of the litharge in suspension in water containing the activator, the said first portion of the litharge being substantially less than that required to convert the arsenic acid into insoluble acid lead arsenate at equilibrium, maintaining intimate contact between the said first portion of the litharge, the arsenic acid and the activator until substantially all of the said first portion of litharge is converted into insoluble acid lead arsenate in suspension in the water leaving a substantial portion of the arsenic acid unreacted upon, then chemically reacting the mixture of the insoluble acid lead arsenate thus formed and the unreacted portion of the arsenic acid with the remaining portion of the litharge necessary to convert at equilibrium substantially all of the said acid lead arsenate and the said remaining portion of the unreacted arsenic acid into a basic arsenate of lead but not substantially more than a total of about 3.37 moles to each mole of arsenic pentoxide as originally employed in the first step and separating the basic arsenate of lead from the water and the water-soluble activator.

3. In the method of making an arsenate of lead, the particles of which have an average composition corresponding to a basic arsenate of lead, by the chemical interaction of arsenic acid, a water-suspension of litharge and a relatively small proportion of a water-soluble activator, the steps which comprise first chemically reacting the arsenic acid with a first portion of the litharge in suspension in water containing the activator, the said first portion of the litharge being substantially less than that required to convert the arsenic acid into insoluble acid lead arsenate at equilibrium, maintaining intimate contact between the said first portion of the litharge, the arsenic acid and the activator until substanially all of the said first portion of litharge is converted into insoluble acid lead arsenate in suspension in the water leaving a substantial portion of the arsenic acid unreacted upon, then chemically reacting the mixture of the insoluble acid lead arsenate thus formed and the unreacted portion of the arsenic acid with the remaining portion of the litharge necessary to convert, at equilibrium, substantially all of the said acid lead arsenate and the said remaining portion of the unreacted arsenic acid into a basic arsenate of lead but not substantially more than a total of about 3.37 moles to each mole of arsenic pentoxide as originally employed in the first step and removing a portion of the water and the water-soluble activator from the reaction mixture to form a wet sludge of the basic arsenate of lead and then drying the wet sludge to form a substantially dry bulky arsenate of lead.

4. In the method of making an arsenate of lead, the particles of which have an average composition corresponding to a basic arsenate of lead, by the chemical interaction of arsenic acid, a water-suspension of litharge and a relatively small proportion of a water-soluble activator, the steps which comprise first chemically reacting the arsenic acid with a first portion of the litharge in suspension in water containing the activator, the said first portion of the litharge being substantially less than that required to convert the arsenic acid into insoluble acid lead arsenate at equilibrium, maintaining intimate contact between the said first portion of the litharge, the arsenic acid and the activator until substantially all of the said first portion of litharge is converted into insoluble acid lead arsenate in suspension in the water leaving a substantial portion of the arsenic acid unreacted upon, then chemically reacting the mixture of the insoluble acid lead arsenate thus formed and the unreacted portion of the arsenic acid with the remaining portion of the litharge necessary to convert, at equilibrium, substantially all of the said acid lead arsenate and the said remaining portion of the unreacted arsenic acid into a basic arsenate of lead but not substantially more than a total of about 3.37 moles to each mole of arsenic pentoxide as originally employed in the first step and separating the basic arsenate of lead from the water and the water-soluble activator by sedimentation to form a relatively thick sludge containing basic arsenate of lead and then drying the sludge to form a substantially dry bulky basic arsenate of lead.

5. In the method of making an arsenate of lead, the particles of which have an average composition corresponding to a basic arsenate of lead, by the chemical interaction of arsenic acid, a water-suspension of litharge and a relatively small proportion of a water-soluble activator, the steps which comprise first chemically reacting two molar weights of the arsenic acid with not less than about one molar weight and not more than about two molar weights of the litharge to convert substantially all of the two molar weights of litharge into insoluble acid lead arsenate in suspension in the water leaving a substantial portion of the arsenic acid unreacted upon, then chemically reacting the acid lead arsenate thus produced and the unreacted portion of the arsenic acid with a second quantity of litharge sufficient in amount to convert, at equilibrium, substantially all of the said insoluble acid lead arsenate and the unreacted portion of the arsenic acid into basic arsenate of lead, but not substantially more than a total of about 3.37 moles to each mole of arsenic pentoxide as originally employed in the first step.

6. In the method of making an arsenate of lead, the particles of which have an average composition corresponding to a basic arsenate of lead, by the chemical interaction of arsenic acid, a water-suspension of litharge and a relatively small proportion of a water-soluble activator, the steps which comprise first chemically reacting two molar weights of the arsenic acid with not less than about one molar weight and not more than about two molar weights of the litharge to convert substantially all of the two molar weights of litharge into insoluble acid lead arsenate in suspension in the water leaving a substantial portion of the arsenic acid unreacted upon, then chemically reacting the acid lead arsenate thus produced and the unreacted portion of the arsenic acid with a second quantity of litharge sufficient in amount to convert, at equilibrium, substantially all of the said acid lead arsenate and the unreacted portion of the arsenic acid into basic arsenate of lead, but not substantially more than a total of about 3.37 moles to each mole of arsenic pentoxide as originally employed in the first step, and separating the basic arsenate of lead from the water and the water-soluble activator.

7. In the method of making an arsenate of lead, the particles of which have an average composition corresponding to a basic arsenate of lead, by the chemical interaction of arsenic acid, a water-suspension of litharge and a relatively small proportion of a water-soluble activator, the steps which comprise first chemically reacting two molar weights of the arsenic acid with not less than about one molar weight and not more than about two molar weights of the litharge to convert substantially all of the two molar weights of litharge into insoluble acid lead arsenate in suspension in the water leaving a substantial portion of the arsenic acid unreacted upon, then chemically reacting the acid lead arsenate thus produced and the unreacted portion of the arsenic acid with a second quantity of litharge sufficient in amount to convert, at equilibrium, substantially all of the said acid lead arsenate and the unreacted portion of the arsenic acid into basic arsenate of lead, but not substantially more than a total of about 3.37 moles to each mole of arsenic pentoxide as originally employed in the first step and removing a portion of the water and the water-soluble activator from the reaction mixture to form a wet sludge of the basic arsenate of lead and then drying the wet sludge to form a substantially dry bulky arsenate of lead.

8. In the method of making an arsenate of lead, the particles of which have an average composition corresponding to a basic arsenate of lead, by the chemical interaction of arsenic acid, a water-suspension of litharge and a relatively small proportion of a water-soluble activator, the steps which comprise first chemically reacting two molar weights of the arsenic acid with not less than about one molar weight and not more than about two molar weights of the litharge to convert substantially all of the two molar weights of the litharge into insoluble acid lead arsenate in suspension in the water leaving a substantial portion of the arsenic acid unreacted upon, then chemically reacting the acid lead arsenate thus produced and the unreacted portion of the arsenic acid with a second quantity of litharge sufficient in amount to convert, at equilibrium, substantially all of the said acid lead arsenate and the unreacted portion of the arsenic acid into basic arsenate of lead, but not substantially more than a total of about 3.37 moles to each mole of arsenic pentoxide as originally employed in the first step, and separating the basic arsenate of lead from the water and the water-soluble activator by sedimentation to form a relatively thick sludge containing basic arsenate of lead and then drying the sludge to form a dry bulky basic arsenate of lead.

9. In the method of making an arsenate of lead, the particles of which have an average composition corresponding to basic arsenate of lead, by the chemical interaction of arsenic acid, a water suspension of litharge and a relatively small amount of a water-soluble activator, the steps which comprise first slowly adding a water-solution of the arsenic acid to a first portion of the litharge in suspension in water containing the soluble activator, said first portion of litharge in suspension in water being less than that required to convert all of the arsenic acid to insoluble acid lead arsenate, maintaining intimate contact between the arsenic acid and the said first portion of suspended litharge and the activator until substantially all of the said first portion of litharge is converted into insoluble acid lead arsenate leaving a substantial portion of the arsenic acid unreacted upon, then chemically reacting the mixture of the acid lead arsenate thus formed and the unreacted portion of the arsenic acid with the remaining portion of the litharge to convert, at equilibrium, substantially all of the said acid lead arsenate and the said remaining portion of the unreacted arsenic acid into a basic arsenate of lead.

10. In the method of making an arsenate of lead, the particles of which have an average composition corresponding to basic arsenate of lead, by the chemical interaction of arsenic acid, a water suspension of litharge and a relatively small amount of a water-soluble activator, the steps which comprise first slowly adding a water-solution of the arsenic acid to a first portion of the litharge in suspension in water containing the soluble activator, said first portion of litharge in suspension in water being less than that required to convert all of the arsenic acid to insoluble acid lead arsenate, maintaining intimate contact between the arsenic acid and the said first portion of suspended litharge and the activator until substantially all of the said first portion of litharge is converted into insoluble acid lead arsenate leaving a substantial portion of the arsenic acid unreacted upon, then chemically reacting the mixture of the acid lead arsenate thus formed and the unreacted portion of the arsenic acid with the remaining portion of the litharge to convert, at equilibrium, substantially all of the said acid lead arsenate and the said remaining portion of the unreacted arsenic acid into a basic arsenate of lead, but not substantially more than a total of about 3.37 moles to each mole of arsenic pentoxide as originally employed in the first step.

11. In the method of making an arsenate of lead, the particles of which have an average composition corresponding to basic arsenate of lead, by the chemical interaction of arsenic acid, a water suspension of litharge and a relatively small amount of a water-soluble activator, the steps which comprise first slowly adding a water-solution of the arsenic acid to a first portion of the litharge in suspension in water containing the soluble activator, said first portion of litharge in suspension in water being less than that required to convert all of the arsenic acid to insoluble acid lead arsenate, maintaining intimate contact between the arsenic acid and the said first portion of suspended litharge and the activator until substantially all of the said first portion of litharge is converted into insoluble acid lead arsenate leaving a substantial portion of the arsenic acid unreacted upon, then chemically reacting the mixture of the acid lead arsenate thus formed and the unreacted portion of the arsenic acid with the remaining portion of the litharge to convert, at equilibrium, substantially all of the said acid lead arsenate and the said remaining portion of the unreacted arsenic acid into a basic arsenate of lead, but not substantially more than a total of about 3.37 moles to each mole of arsenic pentoxide as originally employed in the first step, and separating the basic arsenate of lead from the water and the water-soluble activator.

12. In the method of making an arsenate of lead, the particles of which have an average composition corresponding to basic arsenate of lead, by the chemical interaction of arsenic acid, a water-suspension of litharge and a relatively small amount of water-soluble activator, the steps which comprise first slowly adding a water-solution of the arsenic acid to a first portion of the litharge in suspension in water containing the soluble activator, said first portion of litharge in suspension in water being less than that required to convert all of the arsenic acid to insoluble acid lead arsenate, maintaining intimate contact between the arsenic acid and the said first portion of suspended litharge and the activator until substantially all of the said first portion of litharge is converted into insoluble acid lead arsenate leaving a substantial portion of the arsenic acid unreacted upon, then chemically reacting the mixture of the acid lead arsenate thus formed and the unreacted portion of the arsenic acid with the remaining portion of the litharge to convert, at equilibrium, substantially all of the said acid lead arsenate and the said remaining portion of the unreacted arsenic acid into a basic arsenate of lead, but not substantially more than a total of about 3.37 moles to each mole of arsenic pentoxide as originally employed in the first step and removing a portion of the water and the water-soluble activator from the reaction mixture to form a wet sludge of the basic arsenate of lead and then drying the wet sludge to form a substantially dry bulky arsenate of lead.

13. In the method of making an arsenate of lead, the particles of which have an average composition corresponding to basic arsenate of lead, by the chemical interaction of arsenic acid, a water suspension of litharge and a relatively small amount of a water-soluble activator, the steps which comprise first slowly adding a water-solution of the arsenic acid to a first portion of the litharge in suspension in water containing the soluble activator, said first portion of litharge in suspension in water being less than that required to convert all of the arsenic acid to insoluble acid lead arsenate, maintaining intimate contact between the arsenic acid and the said first portion of suspended litharge and the activator until substantially all of the said first portion of litharge is converted into insoluble acid lead arsenate leaving a substantial portion of the arsenic acid unreacted upon, then chemically reacting the mixture of the acid lead arsenate thus formed and the unreacted portion of the arsenic acid with the remaining portion of the litharge to convert, at equilibrium, substantially all of the said acid lead arsenate and the said remaining portion of the unreacted arsenic acid into a basic arsenate of lead, but not substantially more than a total of about 3.37 moles to each mole of arsenic pentoxide as originally employed in the first step, and separating the basic arsenate of lead from the water and the water-soluble activator by sedimentation to form a relatively thick sludge containing basic arsenate of lead and then drying the sludge to form a dry bulky basic arsenate of lead.

14. In the method of making an arsenate of lead, the particles of which have an average composition corresponding to basic arsenate of lead, by the chemical interaction of arsenic acid, a water suspension of litharge and a relatively small amount of water soluble activator, the steps which comprise first slowly adding a water solution of two moles of arsenic acid to a water suspension of litharge containing not less than about one mole and not more than about two moles of litharge and containing also the water soluble activator, maintaining intimate contact between the arsenic acid and the litharge and the activator until substantially all of the litharge is converted into insoluble acid lead arsenate leaving a substantial portion of the arsenic acid unreacted upon, then adding sufficient litharge to the suspension of the acid lead arsenate and the unreacted portion of the arsenic acid thus obtained to convert, at equilibrium, substantially all of the said acid lead arsenate and the said remaining portion of unreacted arsenic acid into a basic arsenate of lead.

15. In the method of making an arsenate of lead, the particles of which have an average composition corresponding to basic arsenate of lead, by the chemical interaction of arsenic acid, a water suspension of litharge and a relatively small amount of water soluble activator, the steps which comprise first slowly adding a water solution of two moles of arsenic acid to a water suspension of litharge containing not less than about one mole and not more than about two moles of litharge and containing also the water soluble activator, maintaining intimate contact between the arsenic acid and the litharge and the activator until substantially all of the litharge is converted into insoluble acid lead arsenate leaving a substantial portion of the arsenic acid unreacted upon, then adding sufficient litharge to the suspension of the acid lead arsenate and the unreacted portion of the arsenic acid thus obtained to convert, at equilibrium, substantially all of the said acid lead arsenate and the said remaining portion of unreacted arsenic acid into a basic arsenate of lead, but not substantially more than a total of about 3.37 moles to each mole of arsenic pentoxide as originally employed in the first step.

16. In the method of making an arsenate of lead, the particles of which have an average composition corresponding to basic arsenate of lead, by the chemical interaction of arsenic acid, a water suspension of litharge and a relatively small amount of water soluble activator, the steps which comprise first slowly adding a water solution of two moles of arsenic acid to a water suspension of litharge containing not less than about one mole and not more than about two moles of litharge and containing also the water soluble activator, maintaining intimate contact between the arsenic acid and the litharge and the activator until substantially all of the litharge is converted into insoluble acid lead arsenate leaving a substantial portion of the arsenic acid unreacted upon, then adding sufficient litharge to the suspension of the acid lead arsenate and the unreacted portion of the arsenic acid thus obtained to convert, at equilibrium, substantially all of the said acid lead arsenate and the said remaining portion of unreacted arsenic acid into a basic arsenate of lead, but not substantially more than a total of about 3.37 moles to each mole of arsenic pentoxide as originally employed in the first step, and separating the basic arsenate of lead from the water and the water-soluble activator.

17. In the method of making an arsenate of lead, the particles of which have an average composition corresponding to basic arsenate of lead, by the chemical interaction of arsenic acid, a water suspension of litharge and a relatively small amount of water soluble activator, the steps which comprise first slowly adding a water solution of two moles of arsenic acid to a water suspension of litharge containing not less than about one mole and not more than about two moles of litharge and containing also the water soluble activator, maintaining intimate contact between the arsenic acid and the litharge and the activator until substantially all of the litharge is converted into insoluble acid lead arsenate leaving a substantial portion of the arsenic acid unreacted upon, then adding sufficient litharge to the suspension of the acid lead arsenate and the unreacted portion of the arsenic acid thus obtained to convert, at equilibrium, substantially all of the said acid lead arsenate and the said remaining portion of unreacted arsenic acid into a basic arsenate of lead, but not substantially more than a total of about 3.37 moles to each mole of arsenic pentoxide as originally employed in the first step and removing a portion of the water and the water-soluble activator from the reaction mixture to form a wet sludge of the basic arsenate of lead and then drying the wet sludge to form a substantially dry bulky arsenate of lead.

18. In the method of making an arsenate of lead, the particles of which have an average composition corresponding to basic arsenate of lead, by the chemical interaction of arsenic acid, a water suspension of litharge and a relatively small amount of water soluble activator, the steps which comprise first slowly adding a water solution of two moles of arsenic acid to a water suspension of litharge containing not less than about one mole and not more than about two moles of litharge and containing also the water soluble activator, maintaining intimate contact between the arsenic acid and the litharge and the activator until substantially all of the litharge is converted into insoluble acid lead arsenate leaving a substantial portion of the arsenic acid unreacted upon, then adding sufficient litharge to the suspension of the acid lead arsenate and the unreacted portion of the arsenic acid thus obtained to convert, at equilibrium, substantially all of the said acid lead arsenate and the said remaining portion of unreacted arsenic acid into a basic arsenate of lead, but not substantially more than a total of about 3.37 moles to each mole of arsenic pentoxide as originally employed in the first step, and separating the basic arsenate of lead from the water and the water-soluble activator by sedimentation to form a relatively thick sludge containing basic arsenate of lead and then drying the sludge to form a dry bulky basic arsenate of lead.

JOHN F. LES VEAUX.